(12) United States Patent
Armstrong et al.

(10) Patent No.: US 7,251,814 B2
(45) Date of Patent: Jul. 31, 2007

(54) YIELD ON MULTITHREADED PROCESSORS

(75) Inventors: William Joseph Armstrong, Mantorville, MN (US); Chris Francois, Apple Valley, MN (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 09/939,235

(22) Filed: Aug. 24, 2001

(65) Prior Publication Data

US 2003/0041090 A1 Feb. 27, 2003

(51) Int. Cl.
*G06F 9/46* (2006.01)
(52) U.S. Cl. .................... 718/104; 718/100
(58) Field of Classification Search .......... 718/1, 718/100–108
See application file for complete search history.

(56) References Cited

U.S. PATENT DOCUMENTS

| | | | |
|---|---|---|---|
| 4,400,769 A | 8/1983 | Kaneda et al. | |
| 4,742,447 A | 5/1988 | Duvall et al. | |
| 5,095,427 A | 3/1992 | Tanaka et al. | |
| 5,187,802 A | 2/1993 | Inoue et al. | |
| 5,325,525 A | 6/1994 | Shan et al. | |
| 5,325,526 A | 6/1994 | Cameron et al. | |
| 5,357,632 A | 10/1994 | Pian et al. | |
| 5,361,375 A | 11/1994 | Ogi | |
| 5,404,563 A | 4/1995 | Green et al. | |
| 5,481,747 A * | 1/1996 | Kametani | 718/102 |
| 5,504,670 A | 4/1996 | Barth et al. | |
| 5,535,321 A | 7/1996 | Massaro et al. | |
| 5,574,914 A | 11/1996 | Hancock et al. | |
| 5,692,193 A | 11/1997 | Jagannathan et al. | |
| 5,694,606 A | 12/1997 | Pletcher et al. | |
| 5,872,963 A | 2/1999 | Bitar et al. | |
| 5,898,855 A | 4/1999 | Onodera et al. | |
| 5,978,830 A * | 11/1999 | Nakaya et al. | 718/102 |
| RE36,462 E | 12/1999 | Chang et al. | |
| 6,078,970 A | 6/2000 | Nordstrom et al. | |
| 6,105,050 A * | 8/2000 | Govindaraju et al. | 718/102 |
| 6,195,676 B1 * | 2/2001 | Spix et al. | 718/107 |
| 6,199,093 B1 | 3/2001 | Yokoya | |
| 6,247,109 B1 | 6/2001 | Kleinsorge et al. | |

(Continued)

FOREIGN PATENT DOCUMENTS

JP 62-163149 7/1987

(Continued)

OTHER PUBLICATIONS

David L. Black, "Scheduling Support for Concurrency and Parallelism in the Mach Operating System," Computer, IEEE Computer Society, vol. 23, No. 5, May 1, 1990, pp. 35-43.

(Continued)

*Primary Examiner*—Meng-Ai T. An
*Assistant Examiner*—Kenneth Tang
(74) *Attorney, Agent, or Firm*—Wood, Herron & Evans, LLP

(57) ABSTRACT

An apparatus, program product and method accommodate conventional yield calls within a multithreaded processor environment by coordinating yielding threads within the hypervisor. A hypervisor coordinates the yielding threads within the hypervisor to ensure all threads on a multi-threaded processor execute within the same partition or hypervisor.

28 Claims, 3 Drawing Sheets

U.S. PATENT DOCUMENTS

| | | | |
|---|---|---|---|
| 6,269,391 B1* | 7/2001 | Gillespie | 718/100 |
| 6,279,046 B1 | 8/2001 | Armstrong et al. | |
| 6,381,742 B2 | 4/2002 | Forbes et al. | |
| 6,418,460 B1 | 7/2002 | Bitar et al. | |
| 6,487,654 B2 | 11/2002 | Dowling | |
| 6,542,926 B2 | 4/2003 | Zalewski et al. | |
| 6,587,938 B1 | 7/2003 | Eilert et al. | |
| 6,598,069 B1 | 7/2003 | Rooney et al. | |
| 6,615,303 B1 | 9/2003 | Endo et al. | |
| 6,625,638 B1 | 9/2003 | Kubala et al. | |
| 6,647,508 B2 | 11/2003 | Zalewski et al. | |
| 6,711,605 B2 | 3/2004 | Sekiguchi et al. | |
| 6,760,783 B1 | 7/2004 | Berry | |
| 6,779,065 B2 | 8/2004 | Murty et al. | |
| 7,080,376 B2* | 7/2006 | Buch | 718/100 |
| 2001/0014905 A1* | 8/2001 | Onodera | 709/102 |
| 2002/0056076 A1 | 5/2002 | van der Made | |
| 2003/0014466 A1* | 1/2003 | Berger et al. | 709/102 |
| 2003/0093655 A1* | 5/2003 | Gosior et al. | 712/228 |
| 2003/0101440 A1 | 5/2003 | Hardin et al. | |

FOREIGN PATENT DOCUMENTS

| | | |
|---|---|---|
| JP | 07-271738 | 10/1995 |
| JP | 10-260850 | 9/1998 |
| JP | 2001188685 | 7/2001 |

OTHER PUBLICATIONS

T. L. Borden et al., "Multiple Operating Systems on One Processor Complex," IBM Systems Journal, vol. 28, No. 1, 1989, pp. 104-122.

Shigekazu Inohara et al., "A Thread Facility Based on User/Kernel Cooperation in the XERO Operating System," Computer Software and Applications Conference, 1991, Sep. 11, 1991, pp. 398-405.

Menasee, D. et al. "Capacity Planning and Performance Modeling", ISBN 0-13-035494-5, © 1994.

Leutenegger et al. "A Modeling Study of the TPC-C Benchmark", Proceedings of the 1993 ACM SIGMOD Int'l Conference on Management of Data, 1993, pp. 22-31.

Levine, C. "Order-of-Magnitude Advantage on TPC-C Through Massive Parallelism", Proceedings of the 1995 ACM SIGMOD Int'l Conference on Management of Data, 1995, pp. 464-465.

IBM Corporation, "AS/400 Logical Partitions Hardware Planning Guide", © 1999.

Schimunek, G. et al. "Slicing the AS/400 With Logical Partitioning: A How to Guide", Aug. 1999.

IBM Corporation, "LPAR Configuration and Management", First Edition, © Apr. 2002.

Bakshi et al., "Partioning and Pieplining for Performance-Constrained Hardware/Software Systems," 1999 IEEE, pp. 419-432.

Ayachi et al., "A Hierarchical Processor Scheduling Policy for Multiprocessor Systems," 1996 IEEE, pp. 100-109.

IBM AS/400e Logical Partitions: Learning About. © 1999, 2000. publib.boulder.ibm.com/pubs/htmlas400/v4r5/ic2924/info/rzajx.pdf.

IBM AS/400e Logical Partitions: Planning for. © 1999, 2000. publib.boulder.ibm.com/pubs/html/as400/v4r5/ic2924/info/rzait.pdf.

IBM AS/400e Logical Partitions: Creating. © 1999, 2000. publib.boulder.ibm.com/pubs/html/as400/v4r5/ic2924/info/rzaj7.pdf.

IBM AS/400e Logical Partitions: Managing. © 1999, 2000. publib.boulder.ibm.com/pubs/html/as400/v4r5/ic2924/info/rzaj6.pdf.

IBM AS/400e Logical Partitions: Troubleshooting. © 1999, 2000. publib.boulder.ibm.com/pubs/html/as400/v4r5/ic2924/info/rzaj8.pdf.

IBM Corporation, S/390 Processor Resource/Systems Manager Planning Guide (IBM Pub. No. GA22-7236-04, 5th Edition, Mar. 1999).

Marisa Gil et al., "The Enhancement of a User-level Thread Package Scheduling on Multiprocessors," Sep. 1994, Euromicro Workshop on Parallel and Distributed Processing, pp. 228-236.

David L. Black, "Scheduling Support for Concurrency and Parallelism in the Mach Operating System" Computer, IEEE Computer Society; May 1, 1990; vol. 23, No. 5, pp. 35-43.

* cited by examiner

YIELD ON MULTITHREADED PROCESSORS

FIELD OF THE INVENTION

The present invention relates to computing systems, and more particularly, to yielding a CPU within a logically-partitioned environment.

BACKGROUND OF THE INVENTION

The speed and efficiency of many computing applications depends upon the availability of processing resources. To this end, computing architectures such as the "virtual machine" design, developed by International Business Machines Corporation, share common processing resources among multiple processes. Such an architecture may conventionally rely upon a single computing machine having one or more physical controllers, or central processing units (CPUs). The CPUs may execute software configured to simulate multiple virtual processors. Each virtual processor may embody an independent unit of execution, or thread.

A CPU that can concurrently maintain more than one such unit or path of execution is a called a multithreaded CPU or processor. Each path of execution is called a thread. In a multithreaded CPU system, each thread performs a specific task that may be executed independently of the other threads. For efficiency purposes, each thread may share some physical resources of a CPU, such as buffers, hardware registers and address translation tables. This hardware architecture mandates that all threads of a multithreaded CPU execute within the same virtual address space. For instance, if a CPU supports two threads, both threads must execute within the same partition or hypervisor, as discussed below.

A partition may logically comprise a portion of a machine's CPUs, memory and other resources, as assigned by an administrator. As such, the administrator may share physical resources between partitions. Each partition will host an operating system and may have multiple virtual processors. In this manner, each partition operates largely as if it is a separate computer. An underlying program called a "hypervisor," or partition manager, may use this scheme to assign and dispatch physical resources to each partition. For instance, the hypervisor may intercept requests for resources from operating systems to globally share and allocate them. If the partitions are sharing processors, the hypervisor allocates physical CPUs between the virtual processors of the partitions sharing the processor.

In an effort to increase the speed of conventional (non-multithreaded), partitioned environments where partitions are sharing processors, system designers commonly implement yield calls. Yield calls generally represent programable attempts to efficiently distribute CPUs among partitions sharing processing availability. For instance, an operating system executing a thread may issue a yield call to a hypervisor whenever the thread spins in a lock or executes its idle loop. Such an idle thread may have no work to perform, while a locked thread may "spin" as it waits for the holder of the lock to relinquish it. In response to the yield call, the thread may enter an idle state, while the hypervisor reallocates the CPU.

More particularly, a virtual processor that is spinning on a lock held by another virtual processor may initiate a yield-to-active call. In response to the yield-to-active command, the virtual processor may enter an idled state and relinquish its CPU. The hypervisor may reallocate the yielded CPU to the next virtual processor presented on a dispatch schedule of the hypervisor.

Should a thread be in an idle loop, the operating system executing the thread may make a timed-yield. Such a yield call may cause the operating system to relinquish its CPU for a period specified within the yield call. The duration may correspond to an interval of time where the operating system running the thread does not require the CPU that has been dispatched to it. As such, the timed-yield allows the CPU to be utilized by another virtual processor until a time-out event registers. Of note, the virtual processor may be in a different partition. The time-out may coincide with the expiration of the specified interval, at which time the hypervisor will end the yield operation and dispatch a CPU back to the operating system that originally executed the thread.

While such yield applications may succeed in improving the efficiency of some processing systems, known yield processes are not designed for multithreaded CPU environments. Subsequently, yield processes often do not conform to the operating rules and hardware requirements specific to the multithreaded CPU environments. Namely, known yield processes fail to address the requirement that all thread executing on a multithreaded CPU must execute within the same virtual space. Furthermore, conventional yield processes do not regard the independent execution of such threads, nor do they offer a means of monitoring and coordinating thread execution. Consequently, there is a need for an improved manner of managing the allocation of physical computing resources within a multithreaded CPU environment.

SUMMARY OF THE INVENTION

One embodiment consistent with the principles of the present invention includes an apparatus, method, and program product configured to facilitate the sharing of physical resources on a multithreaded CPU. More specifically, to coordinate the yielding of multiple threads executing on a multithreaded CPU. The yield of a first thread may be deferred while it waits for at least a second thread of the CPU to become ready to yield. For instance, the embodiment may spin the first thread as it waits for other threads of the CPU to make yield calls. In response to the second thread becoming ready to yield, the first thread may yield, itself. More particularly, the embodiment may place at least the first and second threads of the processor on an idle loop. A program of the embodiment may additionally save the states of the operating system(s) executing the threads. Alternatively, a program of the embodiment may abandon the yield of the first thread while spinning and after detecting an event, such as a time-out or external I/O interrupt, that is related to the reason that initially required the yield in the first place.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

An embodiment of the present invention may include an apparatus, program product and method for accommodating conventional yield calls within a multithreaded CPU environment by coordinating yield processes within the hypervisor. More particularly, a thread encountering a spin lock or idle loop makes a yield call to the hypervisor. In response, the hypervisor gathers and spins yielding threads within the hypervisor to ensure all threads yield within the same virtual space. Namely, the hypervisor spins threads in a ready-to-yield state, until all threads are prepared to yield together. Upon recognizing that all threads are in the requisite ready state, the hypervisor may save the operating system states of all threads and place them in the hypervisor idle loop. Alternatively, a spinning thread may abort its yield call in response to detecting an external I/O interrupt or time-out event. An environment suited for execution of such an embodiment is illustrated in FIGS. 1 and 2.

Hardware and Software Environment

Figure 1:
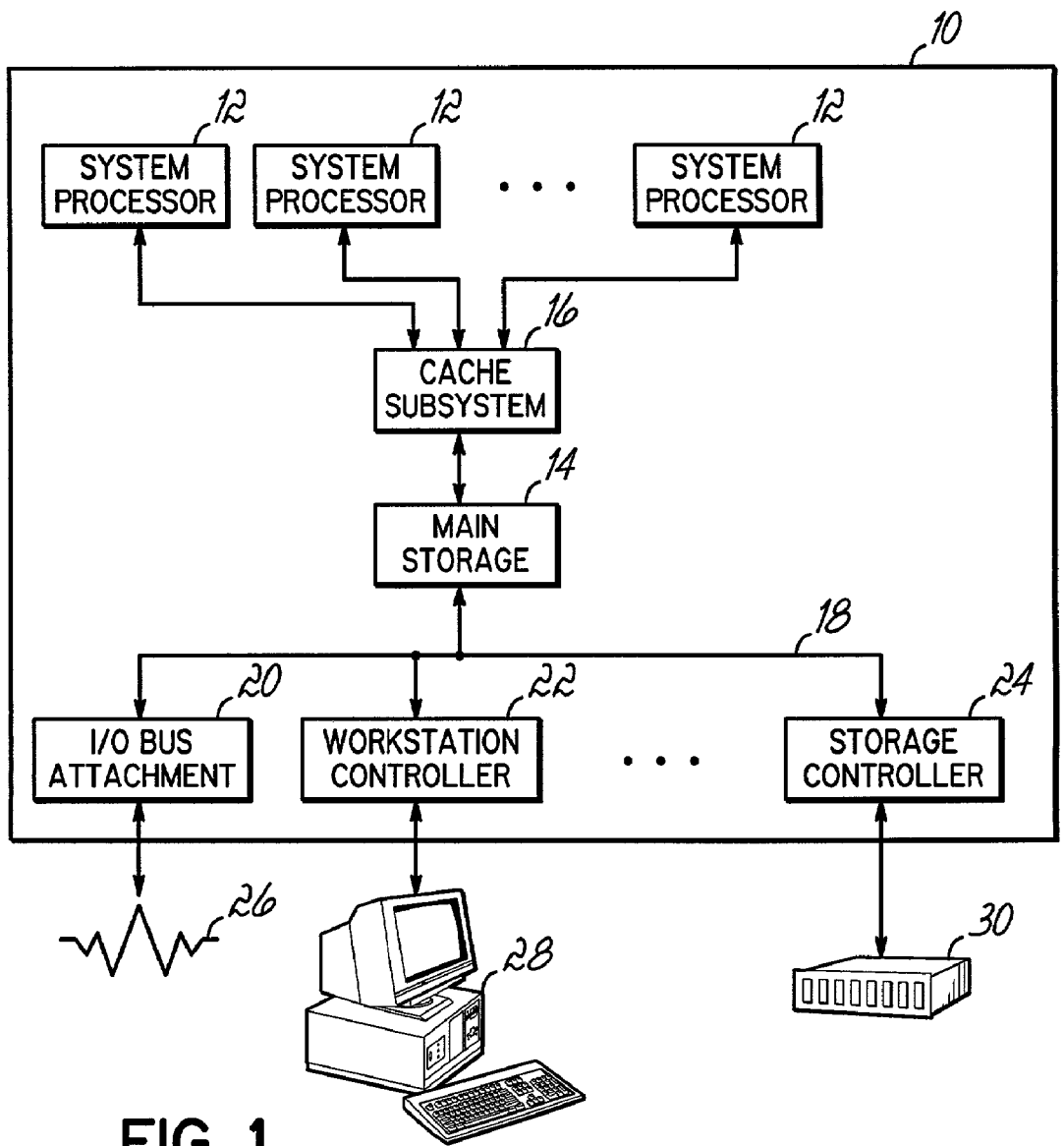
FIG. 1 is a block diagram of a computer consistent with the invention.
Figure 2:
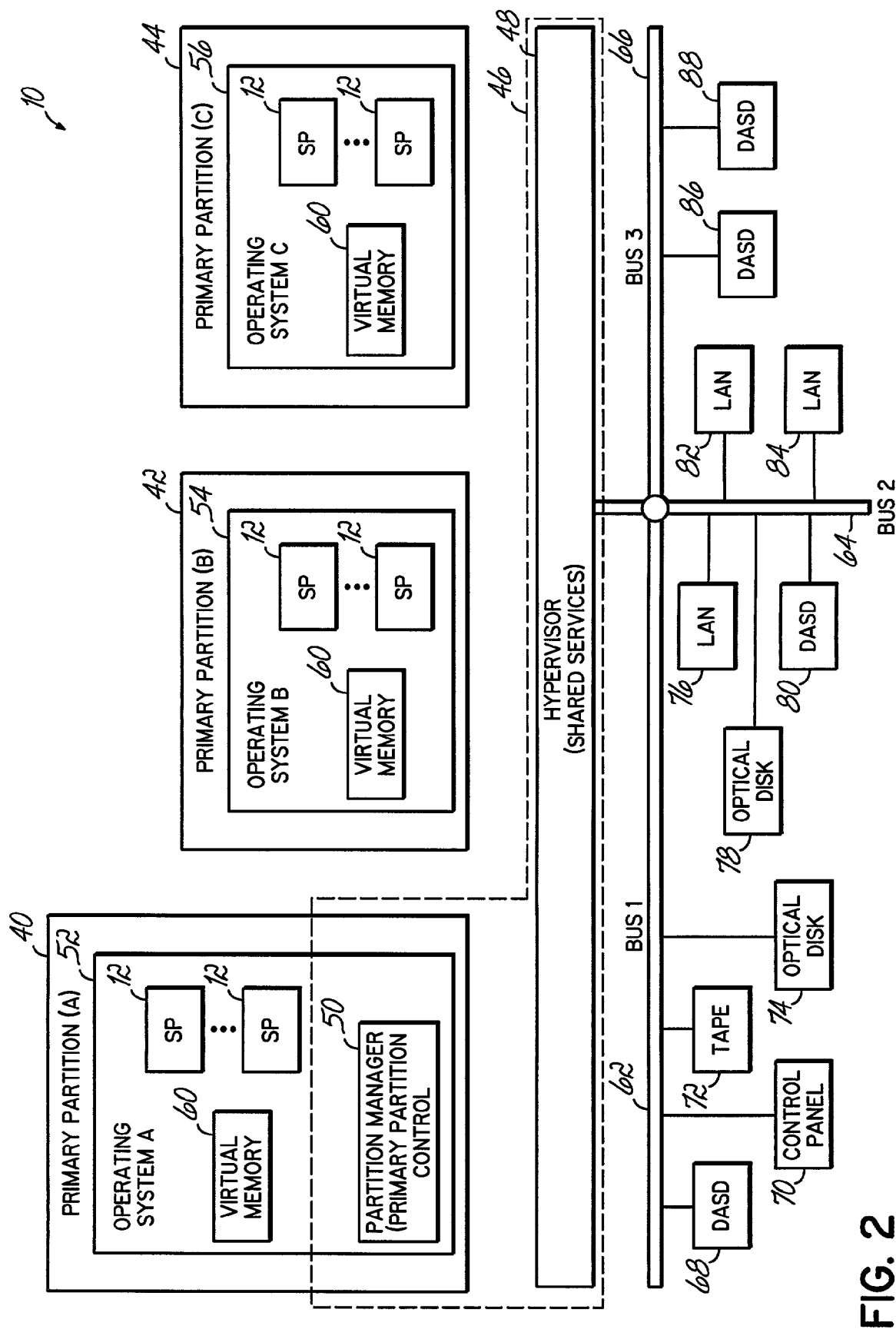
FIG. 2 is a block diagram of the primary software components and resources in the computer of FIG. 1.

Turning to the Drawings, wherein like numbers denote like parts throughout the several views, FIG. 1 illustrates a data processing apparatus or computer 10 consistent with the invention. Apparatus 10 generically represents, for example, any of a number of multi-user computer systems such as a network server, a midrange computer, a mainframe computer, etc. However, it should be appreciated that the invention may be implemented in other data processing apparatus, e.g., in stand-alone or single-user computer systems such as workstations, desktop computers, portable computers, and the like, or in other computing devices such as embedded controllers and the like. One suitable implementation of apparatus 10 is in a midrange computer such as the AS/400 or e series computer available from International Business Machines Corporation.

Apparatus 10 generally includes one or more multi-threaded CPUs 12, or processors, coupled to a memory subsystem including main storage 14, e.g., an array of dynamic random access memory (DRAM). Also illustrated as interposed between multithreaded CPUs 12 and main storage 14 is a cache subsystem 16, typically including one or more levels of data, instruction and/or combination caches, with certain caches either serving individual processors or multiple processors as is well known in the art. Furthermore, main storage 14 is coupled to a number of types of external (I/O) devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 30.

FIG. 2 illustrates in greater detail the primary software components and resources utilized in implementing a logically partitioned, multithreaded CPU environment on computer 10, including a plurality of logical partitions 40, 42, 44 managed by a partition manager or hypervisor 46. Any number of logical partitions may be supported as is well known in the art.

In the illustrated implementation, logical partition 40 operates as a primary partition, while logical partitions 42 and 44 operate as secondary partitions. A primary partition in this context shares some of the partition management functions for the computer, such as handling the powering on or powering off of the secondary logical partitions on computer 10, or initiating a memory dump of the secondary logical partitions. As such, a portion of hypervisor 46 is illustrated by primary partition control block 50, disposed in the operating system 52 resident in primary partition 40. Other partition management services, which are accessible by all logical partitions, are represented by shared services block 48. However, partition management functionality need not be implemented within any particular logical partition in other implementations consistent with the invention.

Each logical partition utilizes an operating system (e.g., operating systems 52, 54 and 56 for logical partitions 40, 42 and 44, respectively), that controls the primary operations of the logical partition in the same manner as the operating system of a non-partitioned computer. Each logical partition 40-44 executes in a separate memory space, represented by virtual memory 60. Moreover, each logical partition 40-44 is statically and/or dynamically allocated a portion of the available resources in computer 10. For example, each logical partition may share one or more processors 12, as well as a portion of the available memory space for use in virtual memory 60. In this manner, a given processor may be utilized by more than one logical partition.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 2 illustrates, for example, three logical buses 62, 64 and 66, with a plurality of resources on bus 62, including a direct access storage device (DASD) 68, a control panel 70, a tape drive 72 and an optical disk drive 74, allocated to primary logical partition 40. Bus 64, on the other hand, may have resources allocated on a resource-by-resource basis, e.g., with local area network (LAN) adaptor 76, optical disk drive 78 and DASD 80 allocated to secondary logical partition 42, and LAN adaptors 82 and 84 allocated to secondary logical partition 44. Bus 66 may represent, for example, a bus allocated specifically to logical partition 44, such that all resources on the bus, e.g., DASD's 86 and 88, are allocated to the same logical partition.

It will be appreciated that the illustration of specific resources in FIG. 2 is merely exemplary in nature, and that any combination and arrangement of resources may be allocated to any logical partition in the alternative. Moreover, it will be appreciated that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 2 and implementing the embodiments of the invention may be implemented in a number of manners, including using various computer software applications, routines, components, programs, objects, modules, data structures, etc., referred to hereinafter as "computer programs," or simply "programs". The computer programs typically comprise one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of signal bearing medium used to actually carry out the distribution. Examples of signal bearing media include but are not limited to recordable type media such as volatile and nonvolatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Multithreaded CPU Yield

Figure 3:
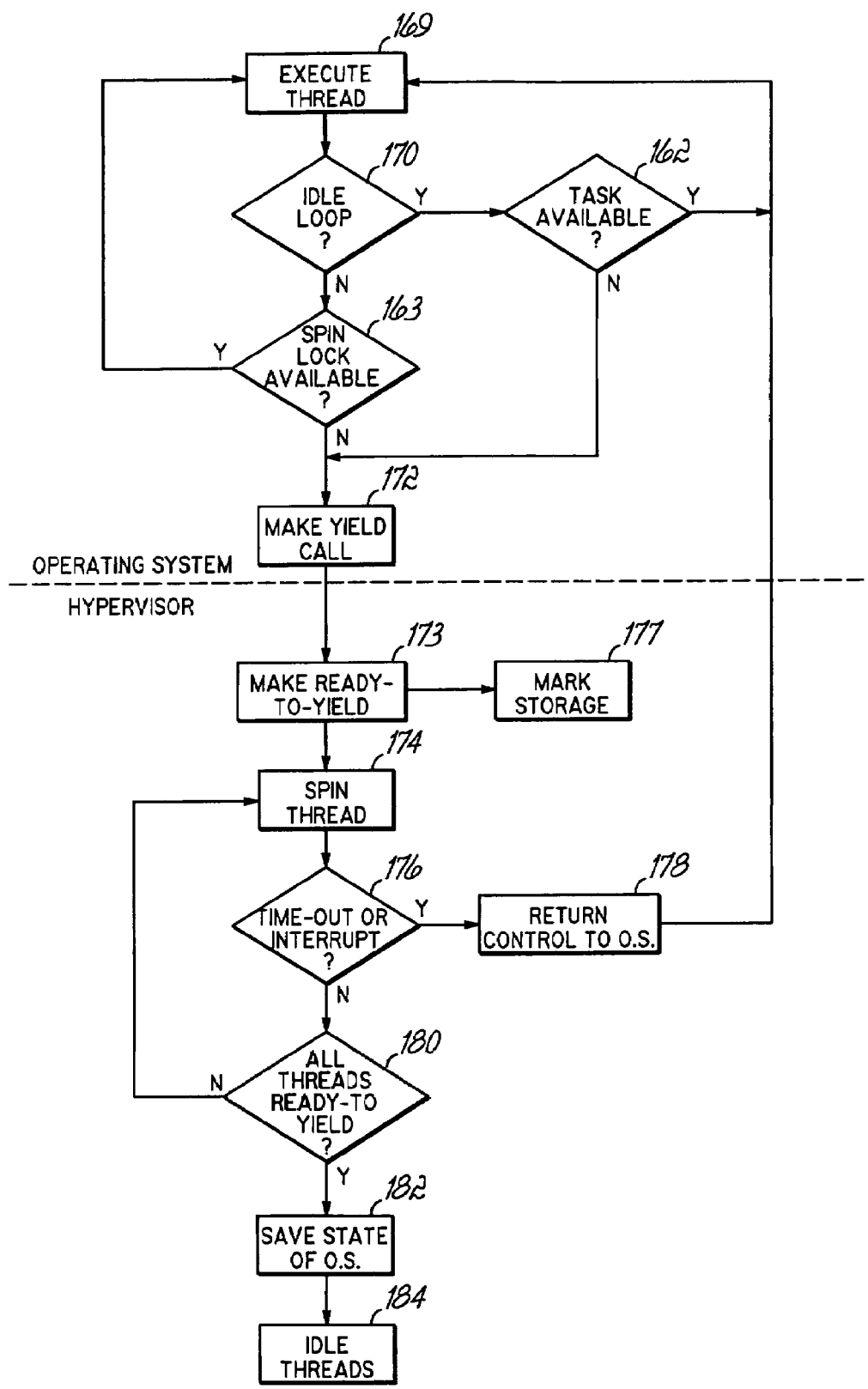
FIG. 3 is a flow chart embodying one method of coordinating yields within the multithreaded CPU environments of FIGS. 1 and 2.

The flowchart of FIG. 3 illustrates an exemplary embodiment for yielding a CPU within the multithreaded CPU hardware and software environments of the first two figures. Generally, the illustrated process steps account for and coordinate conventional yield requests made by threads executing on a multithreaded CPU by deferring yield until all threads are in a ready-to-yield state. In this manner, the embodiment may ensure that all threads execute within the same virtual address space.

More particularly, a program of the embodiment may cause a thread to spin in response to making a conventional yield call. The thread may continue to spin until the condition prompting the yield call is addressed. For instance, the duration of a thread's timed-yield may expire, or it may receive an I/O interrupt. Alternatively, the thread may cease spinning in response to recognizing that all other threads of the CPU are likewise in a ready-to-yield state. As such, the yield of all threads are coordinated within the hypervisor, where they may be dispatched to a next occurring virtual processor. In either case, the spinning thread(s) remain within the same partition as all other threads executing on the CPU. As discussed above, such coordination is essential within a multithreaded CPU environment, where threads share common buffers and CPU resources.

Turning particularly to block 169 of FIG. 3, a thread may register that the hypervisor has dispatched a CPU to it. Ideally, such a thread will presently have a job to execute, the processing of which is not predicated upon some interrupt event or lock release. As such, the thread may execute the task at block 169 without wasting CPU cycles. As discussed above, however, such a condition and associated inefficiencies are commonplace within logically-partitioned environments, and often, in fact, prevent the thread from utilizing the allocated CPU.

For instance at block 170, a thread of an operating system may recognize that it is operating within an idle loop. As such, the operating system will determine at block 162 whether the thread has a task to run. If so, the thread will resume execution at block 169. Should the operating system determine that the thread has no work to perform at block 162, then the operating system may make a yield call at block 172 as discussed below. Alternatively at block 163, the operating system may determine that a thread is spinning on a lock held by another thread. Should the operating system determine at block 163 that the held spin lock is unavailable, then program code of the embodiment may prompt the operating system executing the thread to make a yield call at block 172. As such, a thread makes a yield call in response to either spin lock or idle loop occurrence. In this manner, the embodiment addresses potential inactivity of thread, in that the thread is not actively utilizing its allocated CPU. As discussed above, since the thread holder of the dispatched CPU is inactive, CPU cycles are wasted while the thread is idle or spins.

Of note, the present embodiment is compatible with all conventional yield calls. As discussed below in detail, the embodiment enables known calls within a multithreaded CPU environment by coordinating yield processes within the hypervisor. As discussed above, the type of yield call made by the thread may depend upon the state of the thread. For instance, if a thread is in an idle loop, the operating system executing the thread may make a timed-yield. That is, the yield call made by the operating system to the hypervisor may specify a precise duration. The duration may correspond to an interval of time where the operating system running the thread will not require the CPU dispatched to it. At the expiration of the specified interval, the hypervisor will end the yield operation, and a CPU will be dispatched back to the operating system that originally executed the thread.

Should the inactivity of the thread instead be attributable to a spin lock held by another thread, then the operating system running the thread may initiate a yield-to-active or yield-to-processor call. The latter call is described in greater detail in U.S. patent application Ser. No. _____ filed on even date herewith, by William Joseph Armstrong et al., entitled "System for Yielding to a Processor," the disclosure of which is incorporated by reference. An operating system executing a thread may make a yield-to-active call to the hypervisor whenever the thread is about to enter a spin lock. Conventionally, the yielding thread "spins" as it waits for a prerequisite process to execute or a resource to become available, thereby lifting the lock. In response to the yield-to-active command, the virtual processor may enter an idled state and relinquish its CPU. The hypervisor may reallocate the yielded CPU to the next virtual processor presented on the dispatch schedule of the hypervisor.

Alternatively, a thread caught in a spin lock may initiate a yield-to-processor call. An operating system of such a thread may yield its allocated CPU to a target virtual processor holding the lock. Under such a call, the hypervisor saves the state of the operating system prior to dispatching the surrendered CPU to the operating system of the designated, target virtual processor.

In response to receiving any of the above described yield calls at block 172, the hypervisor may gain control of the thread at block 173. In this manner, the hypervisor now dictates the immediate assignment and actions of the thread previously controlled by the operating system at block 172. Of note, the dashed line bisecting FIG. 3 demarcates the roles performed by the hypervisor and the operating system. More particularly, the operating system initiates the illustrative steps of blocks 162-172, while the hypervisor executes all subsequent blocks. For instance, the hypervisor may cause the thread to spin at block 174. In this manner, all threads of a CPU making a yield call within the multithreaded CPU environment spin within the hypervisor until all threads have similarly made yield calls.

Of note, known yield applications (made outside the context of a multithreaded CPU) conventionally call for a thread to be placed in a hypervisor idle state after making a yield call. The present embodiment departs from conventional yield sequences by instead spinning the thread. This step of block 174 ultimately contributes to coordinating yield processes within a multithreaded CPU environment. Namely, the feature allows all individual threads of a CPU to yield prior to being placed in hypervisor idle loop.

The hypervisor may further mark a shared storage component of the thread making the call at block 177. Of note, such storage may be allocated out of hypervisor storage. More particularly, the hypervisor may mark the storage corresponding to the thread as being "ready-to-yield" at block 173. This ready-to-yield characterization communicates to other threads and to the hypervisor that the thread is prepared to surrender its CPU. Significantly, because the storage is accessible to all other threads of the CPU that have made a yield call, the ready-to-yield designation apprizes these threads of the yielding thread's status. As described below in greater detail, this shared attribute facilitates yield coordination for each thread of the multithreaded CPU.

While spinning within the hypervisor, the thread may monitor the environment for an event at block 176. More particularly, the thread may continually check to see if the condition for its yield has been satisfied. For instance, a spinning thread may encounter a time-out condition. As discussed above, such an event may correspond to a timed-yield made by a thread in an idle loop at block 172. As such, the time-out may occur at the time proscribed for the yield operation to end. For instance, the operating system originating the timed-yield call reacquires access to CPU cycles.

Another type of event recognizable by the spinning thread at block 176 may embody an external I/O interrupt. Exemplary I/O interrupts may include a disk operation or other external compiling function that may take priority over sequential processing of yielded states. Of note, the interrupt may designate or target the specific operating system of the of the spinning thread.

Should the thread register either a time-out or I/O interrupt event, the hypervisor may return control of the thread back to the operating system at block 178. For instance, the operating system running the spinning thread may send a signal to the hypervisor aborting its ready-to-yield call. As such, the yield call may cease at the same instant as the timed-yield ends, or the interrupt occurs, respectively. In this manner, the embodiment affords a spinning thread a final opportunity to realize the event upon which its execution is predicated, prior to idling. As such, this feature may further accommodate conventional yield calls. Ultimately, a thread responding to an external I/O interrupt or a time-out may return to the operating system at the same point from which it made the yield call. Further, execution of the returned thread continues at block 169 as before the yield call of block 172.

In addition to monitoring the multithreaded CPU environment for time-out and interrupt events at block 176, the spinning thread may also evaluate the states of other threads of the CPU. More particularly, the thread may check the storage of each thread to see if they are, themselves, in a ready-to-yield state. As discussed above, thread status is kept in hypervisor storage and is visible to all threads that enter the hypervisor through a yield call.

Should the hypervisor determine at block 180 that all threads of the CPU are not ready to yield, then the thread will continue to spin within the hypervisor at block 174. As before, the thread will cycle through the repeated monitoring operations of blocks 176 and, if necessary, block 180.

Alternatively, should the hypervisor recognize at block 180 that all threads of a CPU are uniformly in a ready-to-yield state, then each thread may save the state of its corresponding operating system at block 182. Saved states may include applicable registers and thread data. The hypervisor may further store the state in such a manner that the thread becomes active at the same point within the operating system in response to the hypervisor dispatching another virtual processor.

Storing the states as such may prepare the threads to become idle at block 184 of FIG. 3. Subsequently, all threads may enter an idle state within the common virtual space of the hypervisor. In so doing, the embodiment fulfills the above discussed requirement governing multithreaded CPU systems. Namely, all threads execute within the same virtual address space. All yielded threads may further remain idle at block 184 until such time as the hypervisor dispatches another or the same partition to all of the threads. The operating system then regains control of all threads and recalls the states saved at block 182. Of note, the operating system acquires control of all threads at the same point where it originally yielded them to the hypervisor at block 173.

While the present invention has been illustrated by a description of various embodiments and while these embodiments have been described in considerable detail, it is not the intention of the applicants to restrict, or in any way limit, the scope of the appended claims to such detail. For instance, all or part of the coordination of yielding threads in another embodiment may be conducted within individual operating systems or partitions, as opposed to at the hypervisor level. As such, all threads may yield to the hypervisor simultaneously.

Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for sharing resources on a multithreaded CPU capable of executing a plurality of threads, the method comprising:
   deferring a yield comprising relinquishing use of the multithreaded CPU by a first thread executing on the multithreaded CPU while waiting for at least a second thread executing on the multithreaded CPU to become ready to yield, wherein the plurality of threads must execute within a common virtual space; and
   yielding the first thread in response to at least the second thread becoming ready to yield.

2. The method according to claim 1, further comprising monitoring the plurality of threads for an occurrence.

3. The method according to claim 2, wherein the occurrence is a spin lock or an idle loop.

4. The method according to claim 2, further comprising making a yield call in response to the occurrence.

5. The method according to claim 1, further comprising marking storage of the first thread in response to receiving the yield call to indicate that the first thread is ready to yield.

6. The method according to claim 1, further comprising spinning the first thread while waiting for at least the second thread to become ready to yield.

7. The method according to claim 1, further comprising abandoning the yield call in response to detecting an event.

8. The method according to claim 7, wherein the event is a time-out or an external interrupt.

9. The method according to claim 7, further comprising returning control of the first thread to an operating system in response to detecting the event.

10. The method according to claim 9, further comprising saving the state of the operating system in response to detecting that at least the second thread is ready to yield.

11. The method according to claim 1, further comprising idling at least the first and second threads within the common virtual space in response to at least the second thread being ready to yield.

12. The method according to claim 11, further comprising idling all threads executing on the multithreaded CPU within the common virtual space.

13. A method for yielding a thread within a multithreaded CPU data processing system, the method comprising:
deferring a yield comprising relinquishing use of the multithreaded CPU by a thread while at least a subset of the plurality of threads yield, wherein each of a plurality of threads executing on a multithreaded CPU must execute within a common virtual space; and
abandoning the yield of the thread in response to detecting an event while the yield is deferred.

14. The method according to claim 13, further comprising yielding the thread after the subset of threads yield, if the subset of threads yield prior to the event.

15. The method according to claim 13, wherein the event is selected from among a group consisting of: a time-out, an I/O interrupt and a combination thereof.

16. An apparatus comprising:
a computer having a multithreaded CPU, wherein the CPU is configured to execute a plurality of threads; and
a program resident in the computer, the program configured to defer a yield comprising relinquishing use of the multithreaded CPU by a first thread of the plurality while waiting for at least a second thread of the plurality to become ready to yield; and further to initiate the yield of the first thread in response to at least the second thread of the plurality becoming ready to yield, wherein the program is configured to ensure that the plurality of threads execute within a common virtual space.

17. The apparatus according to claim 16, wherein the program initiates monitoring the plurality of threads for an occurrence.

18. The method according to claim 17, wherein the occurrence is a spin lock or an idle loop.

19. The apparatus according to claim 17, wherein the program initiates a yield call in response to the occurrence.

20. The apparatus according to claim 16, wherein the program initiates marking storage of the first thread in response to receiving the yield call to indicate that the first thread is ready to yield.

21. The apparatus according to claim 16, wherein the program initiates spinning the first thread while waiting for at least the second thread of the plurality to become ready to yield.

22. The apparatus according to claim 16, wherein the program initiates abandoning the yield call in response to detecting an event.

23. The apparatus according to claim 22, wherein the event is a time-out or an external interrupt.

24. The apparatus according to claim 22, wherein the program initiates returning control of the first thread to an operating system in response to detecting the event.

25. The apparatus according to claim 24, wherein the program initiates saving the state of the operating system in response to detecting that at least the second thread is ready to yield.

26. The apparatus according to claim 16, wherein the program initiates idling at least the first and second threads of the plurality within the common virtual space in response to at least the second thread of the plurality being ready to yield.

27. The apparatus according to claim 26, wherein the program initiates idling all threads of the plurality of threads within the common virtual space.

28. A program product stored in a computer recordable storage medium, comprising:
a program executed by a computer for yielding a thread within a multithreaded CPU data processing system, wherein each of a plurality of threads that execute on a multithreaded CPU must execute within a common virtual space, wherein the program is configured to defer a yield comprising relinquishing use of the multithreaded CPU by a first thread of the plurality while waiting for at least a second thread of the plurality to become ready to yield; and further to initiate the yield of the first thread in response to at least the second thread becoming ready to yield.

* * * * *